(12) United States Patent
Strasser et al.

(10) Patent No.: US 8,906,580 B2
(45) Date of Patent: *Dec. 9, 2014

(54) DE-ALLOYED MEMBRANE ELECTRODE ASSEMBLIES IN FUEL CELLS

(75) Inventors: Peter Strasser, Houston, TX (US); Prasanna Mani, Houston, TX (US); Ratndeep Srivastava, Houston, TX (US)

(73) Assignee: University of Houston System, Houston, TX (US)

( * ) Notice: Subject to any disclaimer, the term of this patent is extended or adjusted under 35 U.S.C. 154(b) by 1154 days.

This patent is subject to a terminal disclaimer.

(21) Appl. No.: 12/250,992

(22) Filed: Oct. 14, 2008

(65) Prior Publication Data

US 2009/0098420 A1    Apr. 16, 2009

Related U.S. Application Data

(60) Provisional application No. 60/979,704, filed on Oct. 12, 2007.

(51) Int. Cl.
| | |
|---|---|
| *H01M 4/02* | (2006.01) |
| *H01M 4/36* | (2006.01) |
| *H01M 4/92* | (2006.01) |
| *H01M 4/90* | (2006.01) |
| *H01M 4/88* | (2006.01) |
| *H01M 4/86* | (2006.01) |
| *H01M 8/10* | (2006.01) |

(52) U.S. Cl.
CPC .......... *H01M 4/8605* (2013.01); *H01M 4/8828* (2013.01); *H01M 4/926* (2013.01); *H01M 4/881* (2013.01); *H01M 2008/1095* (2013.01); *H01M 4/921* (2013.01); *Y02E 60/50* (2013.01); *H01M 4/8882* (2013.01)
USPC .......................................... 429/527; 429/524

(58) Field of Classification Search
USPC .................................................. 429/527, 524
See application file for complete search history.

(56) References Cited

U.S. PATENT DOCUMENTS

| | | | | |
|---|---|---|---|---|
| 7,994,089 | B2 * | 8/2011 | Strasser et al. | 502/300 |
| 2003/0091883 | A1 * | 5/2003 | Peled et al. | 429/25 |
| 2003/0118886 | A1 * | 6/2003 | Morishima et al. | 429/33 |
| 2004/0058224 | A1 * | 3/2004 | Eshraghi et al. | 429/40 |
| 2005/0136298 | A1 * | 6/2005 | Ramani et al. | 429/17 |

FOREIGN PATENT DOCUMENTS

WO    WO 2005/024982 A2 *  3/2005

OTHER PUBLICATIONS

Srivastava et al., Efficient Oxygen Reduction Fuel Cell Electrocatalysis on Voltammetrically Dealloyed Pt—Cu—Co Nanoparticles, Sep. 24, 2007, Angewandte Chemie International Edition, vol. 46, Issue 7, pp. 8988-8991.*

The Enginnering Toolbox (Pressure), 2012, http://www.engineeringtoolbox.com/pressure-d_587.html.*

\* cited by examiner

*Primary Examiner* — Eugenia Wang
(74) *Attorney, Agent, or Firm* — Conley Rose, P.C.

(57) ABSTRACT

Embodiments disclosed herein present a method for membrane electrode assembly (MEA) fabrication in fuel cells utilizing de-alloyed nanoparticle membranes as electrodes. A method for fabrication of a fuel cell electrode assembly, comprising: preparing a catalyst coated membrane, forming a membrane electrode assembly, assembling a fuel cell, and de-alloying the membrane electrode assembly. Further disclosed is a fuel cell apparatus, comprising a de-alloyed catalyst and a cathode comprising, a first membrane electrode assembly, wherein the de-alloyed catalyst is coated on the membrane electrode assembly.

23 Claims, 9 Drawing Sheets

DE-ALLOYED MEMBRANE ELECTRODE ASSEMBLIES IN FUEL CELLS

CROSS-REFERENCE TO RELATED APPLICATIONS

This application claims the benefit under 35 U.S.C. §119 (e) of U.S. Provisional Patent Application No. 60/979,704, filed Oct. 12, 2007, the disclosure of which is incorporated herein by reference in their entirety for all purposes.

STATEMENT REGARDING FEDERALLY SPONSORED RESEARCH OR DEVELOPMENT

Not applicable.

BACKGROUND OF THE INVENTION

1. Field of the Invention

This invention relates generally to the field of PEM (Proton Exchange Membrane, also known as Polymer Electrolyte Membrane) Fuel Cells, i.e., PEMFC. More specifically, the invention relates to a method of preparing Membrane Electrode Assembly, i.e., MEA for PEMFC.

2. Background of the Invention

Increasing investment is being directed into research for new materials and technologies for producing, storing, and using hydrogen as a renewable energy carrier. Hydrogen has implications to reduce dependence on oil as the primary transportation fuel source, to improve energy efficiency, and to address environmental concerns associated with the use of fossil fuel. Due to their high theoretical efficiency, polymer-electrolyte membrane-fuel cells (PEMFCs) will play a critical role as power sources in a hydrogen-based energy infrastructure.

The heart of a PEMFC is a 3-layer Membrane Electrode Assembly (MEA), consisting of anode, membrane electrolyte, and cathode, where hydrogen and oxygen are catalytically converted into water and electricity. The operating conditions and performance characteristics of PEMFCs make them currently the most attractive fuel cell technology for use in automotive and stationary applications. Currently, PEMFCs face severe performance and durability challenges associated with their materials and components. Among them is the performance of the cathode electrocatalyst, the location of molecular oxygen and proton conversion to water by the oxygen reduction reaction (ORR). Various Pt-based catalysts have been used as the ORR cathode electrocatalysts in fuel cells. Catalyst performance is generally expressed as the ratio between the catalytic oxygen reduction activity (cell current at given cell potential) and the cost (equivalent to the employed mass) of the platinum electrocatalysts at the PEMFC cathode. This ratio is generally referred to as the cathode Pt mass activity. It has been estimated that the cathode Pt mass activity has to be improved by a factor of at least 4 compared to ~45 wt % Pt/C standard catalyst before automotive PEMFC cost targets can be met.

SUMMARY

A method for fabricating a de-alloyed fuel cell assembly, comprising: preparing a catalyst suspension; coating a medium with the catalyst suspension, to form a catalyst coated medium; de-alloying the catalyst coated medium to form an electrode assembly; and fabricating a fuel cell using the electrode assembly.

A method for fabrication of a fuel cell electrode assembly, comprising: preparing a catalyst coated membrane; forming a membrane electrode assembly; assembling a fuel cell; and de-alloying the membrane electrode assembly.

A fuel cell apparatus, comprising: a de-alloyed catalyst, wherein the de-alloyed catalyst comprises a nanoparticle; a cathode comprising a first membrane electrode assembly, wherein the de-alloyed catalyst is coated on the membrane electrode assembly; and an anode comprising a second membrane electrode assembly.

The foregoing has outlined rather broadly the features and technical advantages of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of embodiments, reference will now be made to the accompanying drawings in which:

FIG. 9 (b) illustrates X-ray diffraction profile of the carbon-supported $Pt_{80}Cu_{20}$ cathode catalyst (top), of the chemically de-alloyed $Pt_{25}Cu_{75}$ precursor catalyst (resulting in a composition $Pt_{60}Cu_{40}$, center), and of the as-prepared $Pt_{25}Cu_{75}$ (600° C.) precursor (bottom).

DETAILED DESCRIPTION

MEA Fabrication by Ex-situ Chemical De-Alloying

Figure 1:
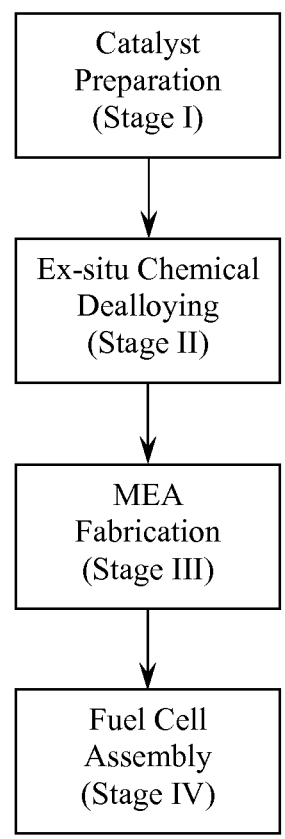
FIG. 1 illustrates an MEA fabrication process utilizing metal catalyst by ex-situ chemical de-alloying.

Ex-situ chemical de-alloying of base metal rich catalyst is utilized for MEA Fabrication in PEMFCs. This process comprises four stages as illustrated in FIG. 1: Catalyst Preparation (Stage I), Ex-situ Chemical De-alloying (Stage II), MEA Fabrication (Stage III), and Fuel Cell Assembly (Stage IV).

This process implements the de-alloyed catalysts, as disclosed in U.S. patent application Ser. No. 12/206,587, filed Sep. 8, 2008, issued as U.S. Pat. No. 7,994,089 on Aug. 9, 2011, and incorporated herein by reference for all purposes, for use in fuel cell components and fuel cells.

Catalyst Preparation (Stage I)

In embodiments, the nanoparticles are comprised of Platinum, Copper, and Cobalt. Platinum (Pt) is a noble metal and Copper (Cu) and Cobalt (Co) are base metals as used herein. In an embodiment, the nanoparticles are comprised of Pt poor alloys of the said metals. The Pt:Cu:Co atomic ratios of metal atoms in the alloy are about 20:40:40, in another embodiment the Pt:Cu:Co atomic ratios of metal atoms in the alloy are about 20:20:60, and in a preferred embodiment the Pt:Cu:Co atomic ratios of metal atoms in the alloy are about 20:60:20. In various other embodiments, the Pt:Cu atomic ratios of metal atoms in the alloy are about 25:75, 50:50, 60:40, 75:25, or 80:20. The ratios of alloys are only exemplary, and are not interpreted to be limiting to the scope of the disclosed invention. Said ratios are altered in fashion to achieve the same result by one skilled in the art. Furthermore, additional material maybe incorporated into the alloy, such as but not limited to gold, silver, nickel, palladium, chromium, molybdenum, manganese, titanium, scandium, or tungsten.

In embodiments, the base metal rich catalyst precursors are synthesized by an impregnation, freeze drying, and annealing method. The Cu—Co base metal solution is created by the dissolution of $Cu(NO_3).6H_2O$ or $Cu(NO_3).2.5H_2O$ and $Co(NO_3).6H_2O$ in a solvent. In other embodiments, the Cu base metal solution is created by the dissolution of $Cu(NO_3)_2.2.5H_2O$ in a solvent. In exemplary embodiments, the solvent used is de-ionized water. In alternative embodiments, the solvent may be any known to one skilled in the art.

The solutions created in said manner are admixed with a weighed amount of Pt supported by high surface area carbon. In embodiments, the Pt concentration by weight is between about 10% and about 80%, in preferred embodiments the wt % is between about 10% and about 50%, and in most preferred embodiments the Pt wt % is between about 18% and about 22%. The carbon supported Pt and Cu—Co solution is ultrasonicated for between about 30 seconds and about 10 minutes, in other embodiments, the solution is ultrasonicated between about 30 seconds and about 2 minutes, and in exemplary embodiments the carbon supported Pt and Cu—Co solution is ultrasonicated for about 1 minute. In certain embodiments, the carbon supported Pt and Cu solution is ultrasonicated for between about 10 minute and about 2 hours, in other embodiments the solution is ultrasonicated between about 30 minutes seconds and about 1 hour, and in exemplary embodiments, the carbon supported Pt and Cu—Co solution is ultrasonicated for about 45 minutes. Alternatively, the carbon supported Pt and base metal solution is sonicated, until a thick slurry is formed. In embodiments, the thick slurry is a catalyst synthesis mixture. The mixture may be a suspension, a colloid, a solution, or other combination of liquids as known to one skilled in the art.

The catalyst synthesis mixture is frozen in liquid nitrogen for about 2 minutes to about 10 minutes, in further embodiments from about 4 minutes to about 7 minutes, and in preferred embodiments for about 5 minutes. In certain embodiments, the catalyst synthesis mixture is frozen in liquid nitrogen for about 5 minutes to about 60 minutes, in further embodiments from about 10 minutes to about 30 minutes, and in preferred embodiments for about 15 minutes.

The catalyst synthesis mixture is freeze-dried under vacuum for about 6 hours to about 18 hours, more preferably for about 6 hours to about 12 hours, and most preferably overnight. In other embodiments, the catalyst synthesis mixture is freeze-dried under vacuum for about 18 hours to about 6 days, more preferably for about 1 day to about 3 days, and most preferably for about 2 days. The freeze-dried catalyst product comprises a powder.

The resulting powder is thinly coated over the bottom of an alumina boat with a lid. In embodiments, the alumina boat may be any shape such as, but not limited to rectangular, circular, square, triangular, or polygonal, without limitation. In further embodiments, the lid at least partially covers the boat. The boat containing the powder of the catalysts synthesis mixture is annealed at a temperature between about 400° C. and about 1200° C., preferably between about 600° C. and about 1000° C., in exemplary embodiments about 800° C. In certain embodiments, the annealing is conducted for about 2 hours to about 20 hours, in more preferred embodiments, the annealing continues for about 4 hours to about 14 hours, and in most preferred embodiments, the annealing continues for about 7 hours.

The annealing process may be carried out in any instrument as known to one skilled in the art, such as, without limitation an oven, or furnace. In preferred embodiments, the annealing is conducted in a flow furnace. In embodiments, the carbon supported Pt and base metal(s) are annealed to form a Pt-base metal/C alloy as the catalyst precursor hereinafter.

Ex-Situ Chemical De-Alloying (Stage II)

In embodiments, obtained catalyst precursor alloy powders are treated with an acid. The acid comprises any strong hydrogen donating acid, such as, without limitation, acetic, hydrochloric, nitric acid, perchloric acid, hydrobromic acid, or hydroiodic acid. In exemplary embodiments, sulfuric acid is used to treat precursor alloy powders.

In embodiments, acid treatment of alloy powders continues for between about 12 hours and about 72 hours, preferably between about 24 hours and about 48 hours, and in exemplary embodiments about 36 hours. In embodiments, the acid concentration used for treatment of alloy powders is between about 0.5 M and about 2.0 M, preferably between about 0.8 M and about 1.5 M, and in exemplary embodiments about 1 M. In embodiments, acid treatment of alloy powders is carried out at a temperature between about 40° C. and about 120° C., preferably between about 60° C. and about 100° C., and in exemplary embodiments about 80° C.

Acid-treated precursor alloys are then washed several times with a solvent. In exemplary embodiments, the solvent used is de-ionized water. In alternative embodiments, the solvent may be any known to one skilled in the art. Washed precursor alloys are then frozen followed by drying. In exemplary embodiments, the freezing process takes place in liquid nitrogen. In alternative embodiments, the freezing process may be any method known to one skilled in the art to achieve the same effects. In exemplary embodiments, the drying process is achieved by vacuum-drying. In alternative embodiments, the drying process may be any method known to one skilled in the art to achieve the same effects. The vacuum-drying process continues for between about 4 hours to about 16 hours, more preferably for between about 6 hours to about 12 hours, most preferably overnight.

MEA Fabrication (Stage III)

A catalyst mixture, hereinafter, a catalyst ink or a catalyst paste, may be prepared by admixing catalyst PtCuCo/C or PtCu/C alloy with cold isopropyl alcohol. In embodiments, the suspended catalyst alloy may be mechanically agitated with a magnetic stirrer, before the solution is ultrasonicated for between about 30 minutes and about 2 hours, preferably between about 45 minutes and about 90 minutes, and in exemplary embodiments about 1 hour.

In preferred embodiments, a sulfonated tetrafluorethylene copolymer, hereinafter NAFION® is added. The solution is ultrasonicated for between about 30 minutes and about 2 hours, preferably between about 45 minutes and about 90 minutes, and in exemplary embodiments about 1 hour. The use of sulfonated tetrafluorethylene copolymer is exemplary as disclosed herein, and any suitable copolymer may be utilized as known to one skilled in the art.

In an embodiment, the catalyst ink or catalyst paste is sprayed unto a membrane through an atomizing nozzle, controlled via a peristaltic pump for precise control of spray. In an embodiment, a plurality of spray cycles may be necessary to achieve catalyst loading. In exemplary embodiments, the membrane utilized is the NAFION™ NRE212 Membrane. In alternative embodiments, any suitable membrane may be utilized as known to one skilled in the art. The spray-cast membranes are dried in an oven at a temperature between about 40° C. and about 120° C., preferably between about 60° C. and about 100° C., in most preferred embodiments at about 80° C. Said heat treatment may be any suitable process as known to one skilled in the art to achieve the same effects.

Fuel Cell Assembly (Stage IV)

In embodiments, prepared MEA is assembled with necessary components into a fuel cell with gas diffusion media. In embodiments, the gas diffusion media may be any suitable material or mixture of material known to one skilled in the art. Then the assembled fuel cells are hydrated with $H_2/O_2$ feed streams at a temperature between about 40° C. and about 120° C., more preferably between about 60° C. and about 100° C., most preferably at about 80° C. In exemplary embodiments, pressure of feed streams is at 101.3 kPa (abs). In alternative embodiments, lower or higher feed stream pressure is employed. In exemplary embodiments, fuel cell hydration condition is at 100% relative humidity (RH). In alternative embodiments, lower RH is employed, for example a relative humidity of at least 70%. In exemplary embodiments, fuel cell hydration takes place at 0.6V cell potential. In alternative embodiments, any other suitable cell potential is utilized, for example at least 0.2V. Fuel cell hydration continues for between about 1 hour and 10 hours, more preferably for between about 2 hours and 8 hours, most preferably for 4 hours.

MEA Fabrication by Ex-Situ Electrochemical De-Alloying or Leaching

Figure 2:
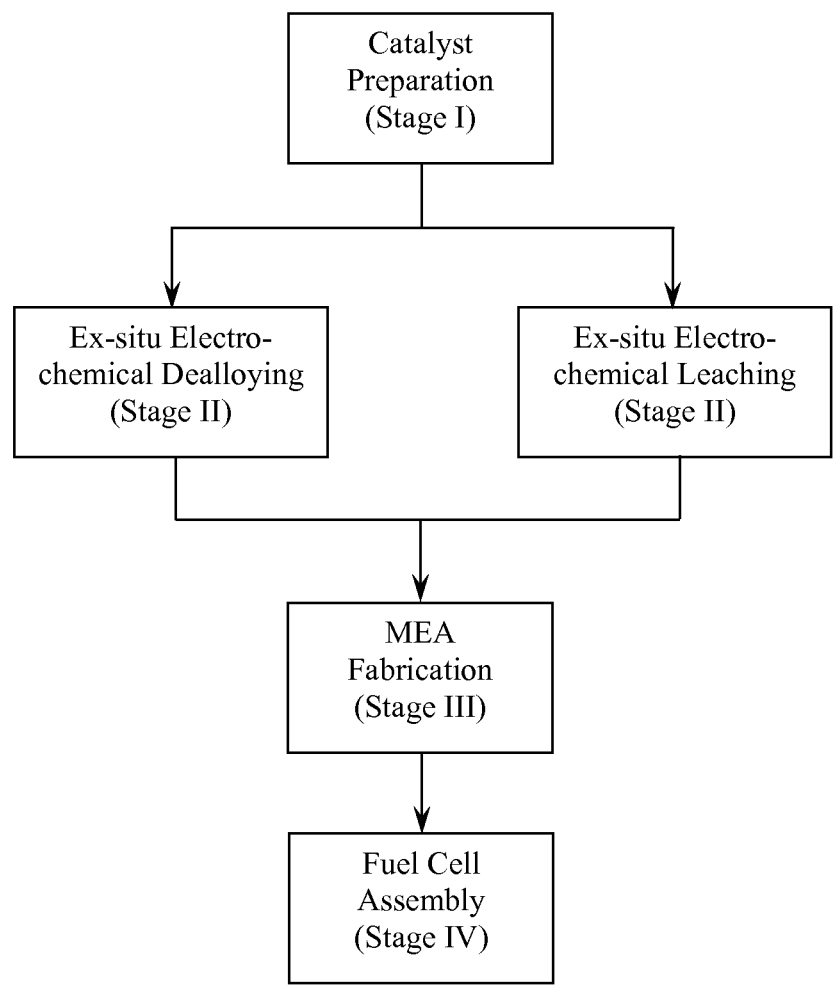
FIG. 2 illustrates an MEA fabrication process utilizing metal catalyst by ex-situ electrochemical de-alloying.

In certain embodiments, ex-situ electrochemical de-alloying or leaching of base metal rich catalyst is utilized for MEA Fabrication in PEMFCs. This process comprises four stages (FIG. 2): Catalyst Preparation (Stage I), Ex-situ Electrochemical De-alloying or Ex-situ Electrochemical Leaching (Stage II), MEA Fabrication (Stage III), and Fuel Cell Assembly (Stage IV).

Catalyst Preparation (Stage I), MEA Fabrication (Stage III), and Fuel Cell Assembly (Stage IV) are described in detail in the corresponding subsections in previous section "MEA Fabrication by Ex-situ Chemical De-alloying". Ex-situ Electrochemical De-alloying or Ex-situ Electrochemical Leaching (Stage II) is described in detail here below.

Ex-Situ Electrochemical De-Alloying or Leaching (Stage II)

An electrochemical de-alloying set up is feasible where precursor catalysts are subject to electrochemical de-alloying outside an MEA arrangement. In such an arrangement, the catalyst is in contact with an electron conductor (electrode) as well as with an ionic conductor (electrolyte) in a 2, 3, 4 or 5 electrode setup in combination with a reference electrode, counter electrode, and possibly additional auxiliary electrodes. Application of potential or current protocols to the electrode in contact with the catalyst powder causes metal leaching or de-alloying. After de-alloying, the de-alloyed catalyst is collected and subject to the MEA Fabrication process.

MEA Fabrication by In-Situ Electrochemical De-Alloying or Leaching

Figure 3:
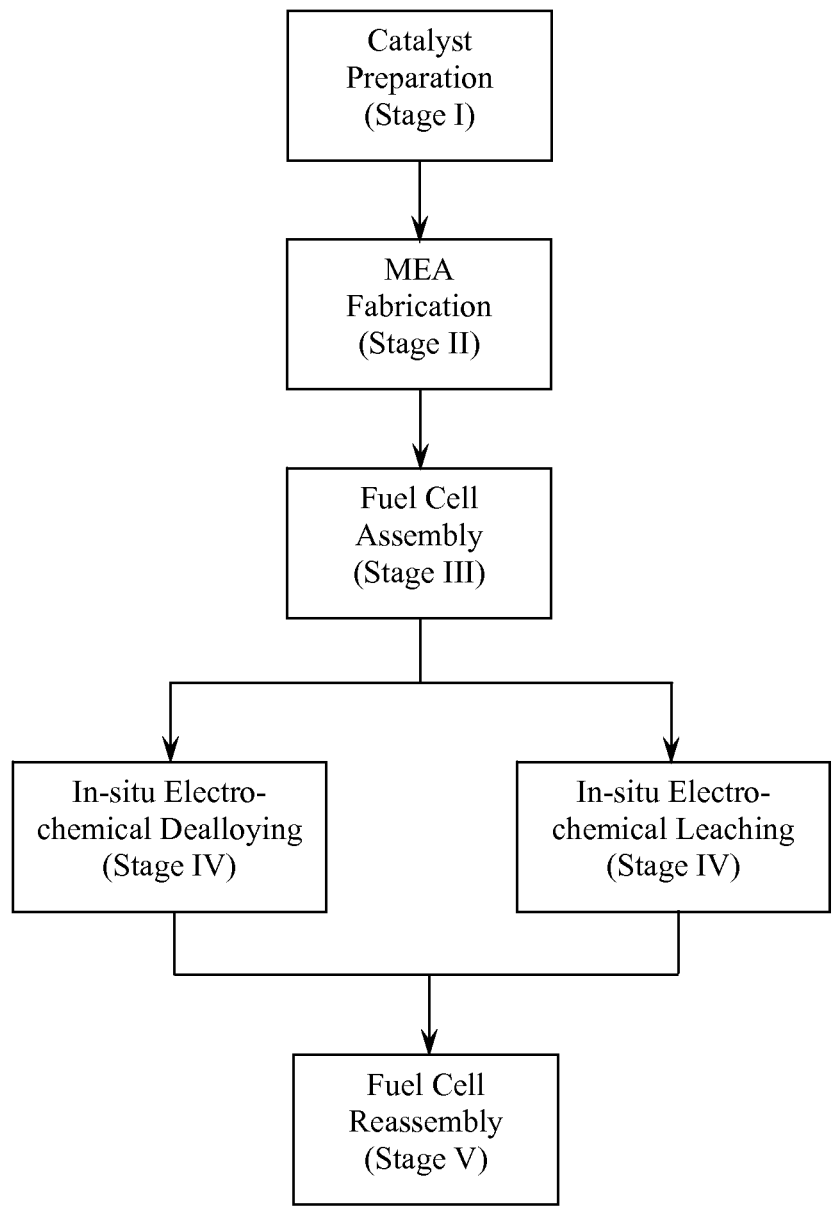
FIG. 3 illustrates an MEA fabrication process utilizing metal catalyst by in-situ electrochemical de-alloying.

In certain embodiments, in-situ electrochemical de-alloying or leaching of base metal rich catalyst is utilized for MEA Fabrication in PEMFCs. This process comprises five stages (FIG. 3): Catalyst Preparation (Stage I), MEA Fabrication (Stage II), Fuel Cell Assembly (Stage III), In-situ Electrochemical De-alloying or In-situ Electrochemical Leaching (Stage IV), and Fuel Cell Reassembly (Stage V).

Methods utilized in Catalyst Preparation (Stage I), MEA Fabrication (Stage II), and Fuel Cell Assembly (Stage III) are described in detail in corresponding subsections in section "MEA Fabrication by Ex-situ Chemical De-alloying". Fuel Cell Reassembly (Stage V) process is a repetition of Fuel Cell Assembly (Stage III). In-situ Electrochemical De-alloying or In-situ Electrochemical Leaching (Stage IV) is described in detail here below.

In-Situ Electrochemical De-Alloying or In-Situ Electrochemical Leaching (Stage IV)

In embodiments, cathode potential is cycled 50-500 times, more preferably 100-300 times, most preferably 200 times at 40-160 mV/s, more preferably 80-120 mV/s, and most preferably 100 mV/s. Reversible hydrogen electrode (RHE) is cycled between 0.2-2.0 V, preferably between 0.4-1.6 V, and most preferably 0.5-1.0 V. The electric cycling process takes places in a de-oxygenated environment (for example $H_2/N_2$) with a relative humidity (RH) of 100% or suitable lower RH, for example a relative humidity of at least 70%. The temperature is maintained between about 40-120° C., more preferably between about 60-100° C., and most preferably at about 80° C. In exemplary embodiments, pressure is maintained at 101.3 kPa (abs). In alternative embodiments, higher or lower pressure may be employed for the electrochemical de-alloying/leaching process.

In embodiments, MEA is disassembled after the electrochemical de-alloying/leaching is completed and treated a few times with a liquid acid, wherein said acid is any strong hydrogen donating acid, such as, with out limitation, acetic, hydrochloric, nitric acid, perchloric acid, hydrobromic acid, or hydroiodic acid. In exemplary embodiments, sulfuric acid is utilized. The concentration of such acids is about 0.5-2.0 M, more preferably 0.8-1.5 M, and most preferably 1.0 M. The acid treatment takes place at a temperature between about 40-120° C., more preferably between about 60-100° C., and most preferably at about 80° C. Each acid treatment continues for about 0.5-2 hours, more preferably for about 0.8-1.5 hours, and most preferably for about 1 hour. Between and after ion exchange washings, the MEA is rinsed with a solvent. In exemplary embodiments, deionized water is used as the solvent. In alternative embodiments, the solvent may be any known to one skilled in the art.

To further illustrate various illustrative embodiments of the present invention, the following examples are provided.

EXAMPLES

Experimental Methods

Catalyst Synthesis and Characterization

Pt—Cu alloy precursors were prepared by an impregnation/freeze drying route followed by annealing. Preparation started with impregnation and sonication of a commercial 30 wt % Pt/C catalyst (Tanaka Kikinzoku International, Inc.) with an aqueous solution of a copper nitrate (Sigma-Aldrich, Inc.), followed by freezing in liquid $N_2$. The frozen sample is subsequently freeze-dried under a moderate vacuum (0.055 mbar). Reduction and alloying of Pt and Cu on the carbon support was thermally driven under a reductive H2 atmosphere using a Lindberg/Blue tube furnace. The bulk atomic composition of the catalysts was determined using a JEOL JSM6330F energy dispersive spectrometer (EDS) after calibrating with the respective pure metal standards or using a VARIAN 820-MS inductively coupled plasma-mass spectrometer (ICP-MS) after blank and standard measurements. Surface atomic composition of the nanoparticles was performed by PHI Model 5700 X-ray photoelectron spectrometer (XPS).

MEA Fabrication and De-Alloying Procedure

Catalyst pastes were prepared by initially blending about 0.13 g of wetted (few drops of deionized water) carbon-supported Pt or Pt—Cu alloy catalyst with 42 mL of refrigerated (15 min) isopropyl alcohol (Aldrich, HPLC grade), followed by 15 min stirring and ultrasonication (Branson 150) for 1 h. Thereafter, about 0.83 grams of a 5 wt % NAFION® solution was added until a catalyst:NAFION® dry weight ratio of about 3:1 was obtained, followed by additional sonication for 1 h. For the anode layer a commercial 40 wt % Pt/C (E-tek Inc.) was used. MEAs were prepared by spraying these pastes through an atomizing nozzle directly onto the NAFION® NRE212 membrane using a high precision robotic machine (PVA Inc.), followed by heat treatment at 80° C.

Pt—Cu precursor was de-alloyed either by a chemical or an electrochemical method. In chemical de-alloying, the precursor powders were treated with 1 M $H_2SO4$ at 80° C. for 36 h and then washed several times with deionized water. Finally the Cu ion-free catalyst was frozen in liquid $N_2$ and vacuum-dried over night. The de-alloyed catalyst powder was then used to prepare the cathode layer.

In electrochemical de-alloying, the precursor material was used to prepare the catalyst paste, which was applied as the cathode layer of an MEA. The MEA was assembled with fuel cell components (see "Fuel Cell Testing" section below) and hydrated at 80° C., 100% RH (H2/O2), 101.3 kPa (abs) by holding cell potential at 0.6V for 4 h. Then the cathode potential was cycled 200 times at 100 mV/s between 0.5-1.0 V/RHE in de-oxygenated condition at 80° C., 100% RH (H2/N2), 101.3 kPa(abs) to electrochemically de-alloy the cathode catalyst. The MEA was then disassembled and treated twice with liquid 1 M $H_2SO4$ at 80° C. for 1 h each. Between and after ion exchange washings the MEA was rinsed with deionized water. The single cell was then re-assembled with fresh gas diffusion media for fuel cell testing of the de-alloyed catalyst. During the break-in procedure (before constant potential activation, after de-alloying, and after ion exchange) slow 20 mV/s CVs were recorded between 0.05-1.2 V in order to characterize the electrochemical interface and the extent of the Cu de-alloying.

Fuel Cell Testing

The prepared MEAs with active area of 10 $cm^2$ were then assembled with gas diffusion media [GDL 10BC (Sigracet, SGL Carbon Inc.)], 3-channel serpentine flow fields (Poco graphite blocks) and gold-coated current collectors and tested in a fuel cell station supplied by Fuel Cell Technologies Inc. The relative humidities of the feed streams for anode/cathode were set at 100% at 80° C. cell temperature. The MEAs were activated with a break-in protocol under 150 kPa (abs) pressure before recording current-voltage characteristics, also 150 kPa (abs). Polarization curves were taken using flows of stoichiometry flows of $\lambda=2/10$ (H2/O2) for $i>0.2$ and 0.2 $A/cm^2$ flows for $i<0.2 A/cm^2$. The performance of the fuel cell was monitored by a data acquisition system from start to stop. IR correction was done by correcting the cell voltage with measured ohmic resistance of the fuel cell by an inbuilt AC impedance analyzer operating at 1 kHz frequency.

Electrochemical Characterization

To accurately measure the activation polarization of the catalyst, it is essential to determine the $H_2$ crossover current in the fuel cell determined by linear sweep voltammetry (LSV). This is done by sweeping the potential at 5 mV/s from 0.05 to 0.6 V (at the same temperature) after i-V recording. At $>0.4$ V the resulting hydrogen oxidation current is purely limited by the $H_2$ permeation rate. Cyclic voltammetry (CV) was performed to dealloy the Cu rich Pt—Cu precursor cathodes (0.5-1.0 V, 80° C. cell temperature, 100% RH of $H_2/N_2$). Additionally the process measured the electrochemical surface area of Pt/C and Pt—Cu/C ($ECSA_{Pt}$) catalysts (0.05-1.2 V, 30° C. cell temperature, 50° C. dew point of $H_2/N_2$ to ensure complete hydration of the electrolyte and to obtain maximum $ECSA_{Pt}$). The scan rate to record the voltammogram was 100 mV/s for de-alloying and 20 mV/s for measuring $ECSA_{Pt}$ and the charge for monolayer hydrogen adsorption/desorption was assumed to be 210 $\mu C/cm^2_{Pt}$. For CV or LSV, the $H_2$ anode served as a counter and reference electrode and the $N_2$-purged cathode was the working electrode, with gas flow of $H_2/N_2=170$ mL/min. All of the voltages here are reported compared with the reversible hydrogen electrode (RHE).

Results and Discussion

Electrocatalytic ORR Activity of Dealloyed Pt—Cu Nanoparticles in Single Fuel Cells To establish relationships between the surface catalytic activity of dealloyed Pt—Cu nanoparticles for the electroreduction of oxygen in a single PEMFC and its synthesis and de-alloying conditions, five distinct carbon-supported Pt—Cu alloy nanoparticles catalyst precursors were synthesized, de-alloyed, tested, and compared to a state-of-the-art Pt catalyst. The Pt weight loading of the carbon supported alloy precursor catalysts ranged from 22 to 27 wt %. Table 1 summarizes the synthesis, de-alloying conditions and the MEA testing results of the catalysts.

Three $Pt_{25}Cu_{75}$ precursors, annealed at 600, 800, and 950° C., were electrochemically de-alloyed using voltammetric cycling between 0.5 and 1.0 V. Furthermore, a $Pt_{25}Cu_{75}$, prepared at 600° C., was chemically de-alloyed using a washing procedure in hot 1 M $H_2SO4$. The chemical and electrochemical de-alloying procedures of $Pt_{25}Cu_{75}$ precursors typically resulted in a final catalyst composition of $Pt_{80}Cu_{20}$ under the conditions chosen in this example. This describes the performances of the four de-alloyed Pt—Cu catalysts compared to a $Pt_{80}Cu_{20}$ precursor catalyst that was not subjected to Cu de-alloying prior to fuel cell testing. The direct comparison of the de-alloyed catalysts with the $Pt_{80}Cu_{20}$ alloy catalyst was to directly determine the activity benefits achieved after the de-alloying activation process at comparable total catalyst composition. All alloy catalysts were compared against a 45 wt % commercial Pt catalyst (TKK Inc.) tested under identical conditions.

Figure 4:
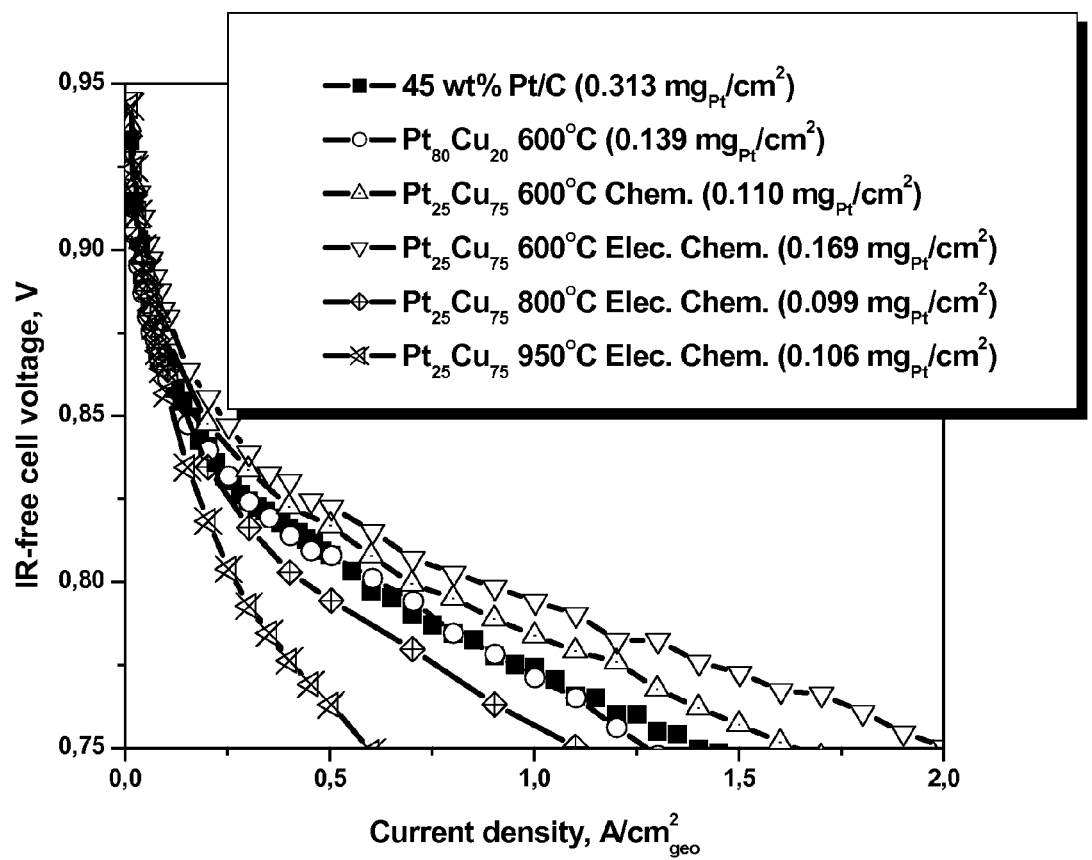
FIG. 4 illustrates current-voltage characteristics of chemically/electrochemically activated $Pt_{25}Cu_{75}$ precursors.

The measured PEMFC potential-current (V-I) polarization curves of the prepared catalysts are compared in FIG. 4 (also see data in Table 1). The V-I curves are mainly governed by the surface reaction kinetics up to geometric current densities of 0.2 A/cm2. At higher current densities, ohmic resistance losses as well as mass transfer effects become significant. In FIG. 4, the linear current density scale in the kinetic region does not allow for a precise ranking of relative catalytic activity. It is apparent, however, that high temperature annealing (950 and 800° C.) has a detrimental effect on the mass transfer characteristics of the carbon-supported catalysts. This is likely attributable to a change in carbon surface functional groups leading to changes in interaction of the carbon support with water and/or ionomer during

TABLE 1

| catalyst comp. atom % | anneal. temp., ° C. | catalyst dealloying method | ECSA, $m^2/g_{Pt}$ | mass activity @ 0.9 V-IR free, $A/mg_{Pt}$ | specific activity @ 0.9 V-IR free, $\mu A/cm^2_{Pt}$ |
|---|---|---|---|---|---|
| $Pt_{100}{}^a$ | | | 63 | 0.104 | 166 |
| $Pt_{80}Cu_{20}$ | 600 | | 67 | 0.207 | 306 |
| $Pt_{25}Cu_{75}$ | 600 | chemical[b] | 75 | 0.374 | 498 |
| $Pt_{25}Cu_{75}$ | 600 | electro-chemical[c] | 72 | 0.340 | 472 |
| $Pt_{25}Cu_{75}$ | 800 | electro-chemical[c] | 48 | 0.356 | 739 |
| $Pt_{25}Cu_{75}$ | 950 | electro-chemical[c] | 21 | 0.413 | 1964 |

[a]45 wt % Pt loading on carbon support (Tanaka Kikinzoku International, Inc.).
[b]Ex situ catalyst powder acid wash.
[c]In situ MEA cathode layer voltammetry.

the catalyst ink and MEA preparation. Similar mass transport characteristics have been observed in RDE test of the ORR activity of carbon supported Pt alloy catalysts after thermal annealing to 950° C. The electrochemically and chemically de-alloyed $Pt_{25}Cu_{75}$ catalysts annealed at 600° C. exhibited the most favorable V-I characteristics over the entire current density range at a much reduced Pt loading of only 0.169 and 0.11 mg $Pt/cm^2$ compared to the Pt standard catalyst with 0.313 mg $Pt/cm^2$.

Figure 5:
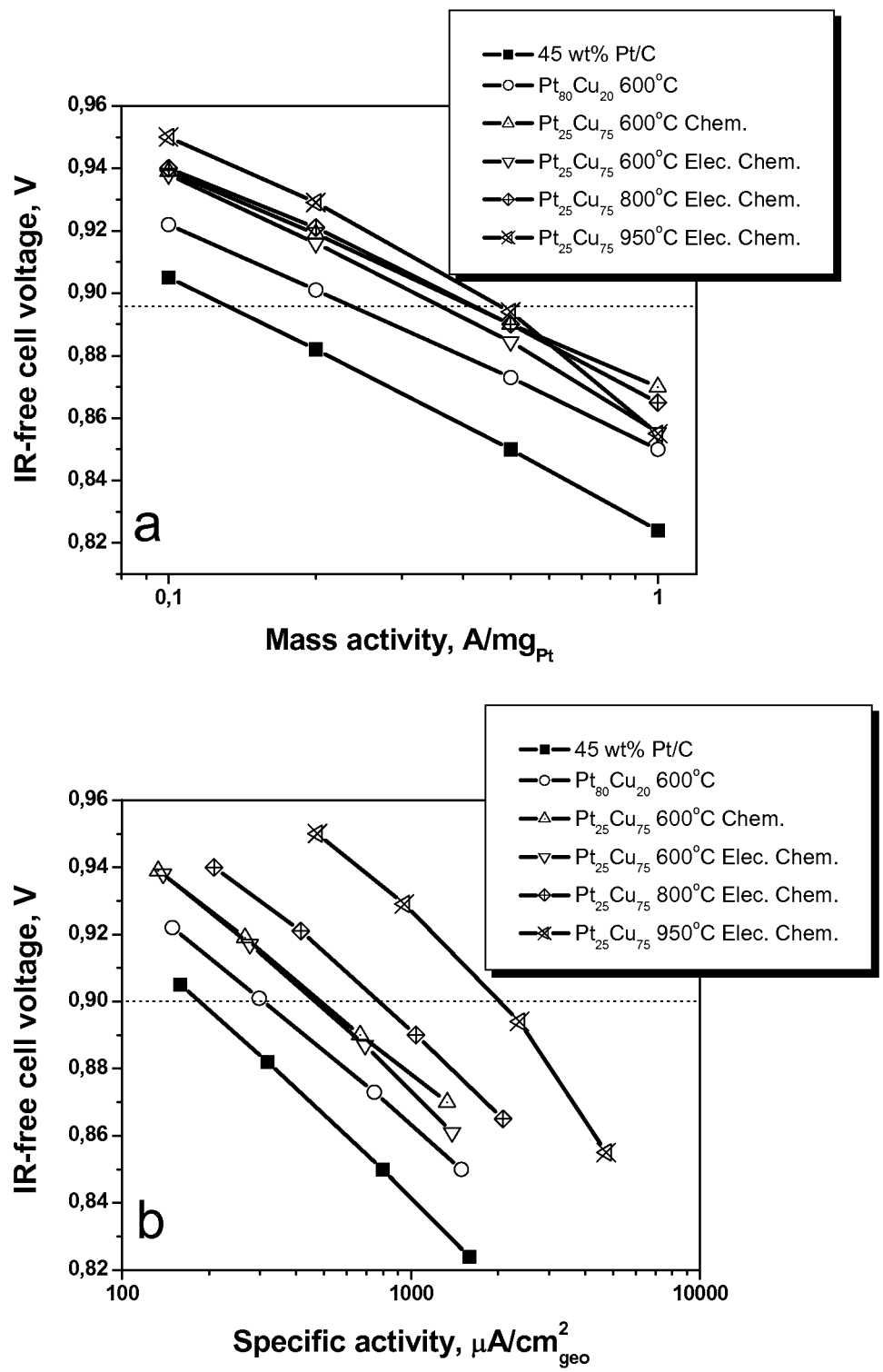
FIG. 5 illustrates a catalytic oxygen reduction activities of Pt—Cu PEMFC cathode electrocatalysts. (a) Cell voltage (V) vs Pt mass activity (A/mg Pt); and (b) cell voltage (V) vs Pt surface area activity ($\mu A/cm^2$ Pt).

FIG. 5 and Table 1 compare the kinetic Pt-mass activity (FIG. 5a) for oxygen reduction as well as the intrinsic kinetic Pt-surface-area based activity (also referred to as specific activity) (FIG. 5b) of all catalysts. The logarithmic current density scale allows for an accurate relative activity ranking at 0.9 V cell voltage. Table 1 also reports the measured electrochemical surface areas (ECSA) of all catalysts. The ECSA value, the Pt mass-based and the specific activity (see Table 1) of the Pt standard, is very consistent with the reported state-of-the-art values.

The chemically and electrochemically de-alloyed catalysts exhibited high, previously unachieved Pt mass activity improvements of a factor of 3.5-4.1 times compared to the standard Pt. The observed Pt specific activity was up to twelve times higher than that of the standard Pt. In situ electrochemically de-alloyed $Pt_{25}Cu_{75}$, prepared at 950° C., exhibited the highest Pt mass activity of 0.41 A/mg Pt among the considered materials. It also showed a very high specific activity of 1964 $\mu A/cm^2$ at 0.9 V. The other two electrochemically de-alloyed catalysts showed Pt mass based performances comparable to that of the chemically de-alloyed material. As expected, the specific activity values strongly correlate inversely with the ECSA values. The activity of the as-prepared $Pt_{80}Cu_{20}$ catalyst exceeded that of Pt by a factor of 2, and is thus comparable to other Pt-rich $Pt_{(1-x)}M_x$ bimetallic catalyst systems for ORR, such as Pt—Co or Pt—Ni when tested under comparable MEA conditions.

The results reported in FIG. 5 and Table 1 display the significant activity advantage of de-alloyed Cu-rich Pt—Cu electrocatalysts for ORR. The advantage over conventional Pt-rich alloy catalysts and confirm previous RDE studies on de-alloyed Pt—Cu catalysts for the electro-reduction of oxygen. The ORR studies in acidic media where de-alloyed carbon supported Pt—Cu nanoparticle catalysts were found to be 4-5 times more active than a state-of-the-art pure Pt nanoparticle electrocatalyst. While de-alloying of Cu ions into a liquid electrolyte during RDE experiments did not affect the ORR measurements and therefore did not require a removal of Cu ions prior to activity tests, a Cu ion exchange step was crucial for MEA measurements. The favorable fuel cell activities also show that the in situ de-alloying preparation of the active catalyst phase lends itself well to a realistic MEA configuration without compromising other MEA components, such as the membrane or the anode.

Figure 6:
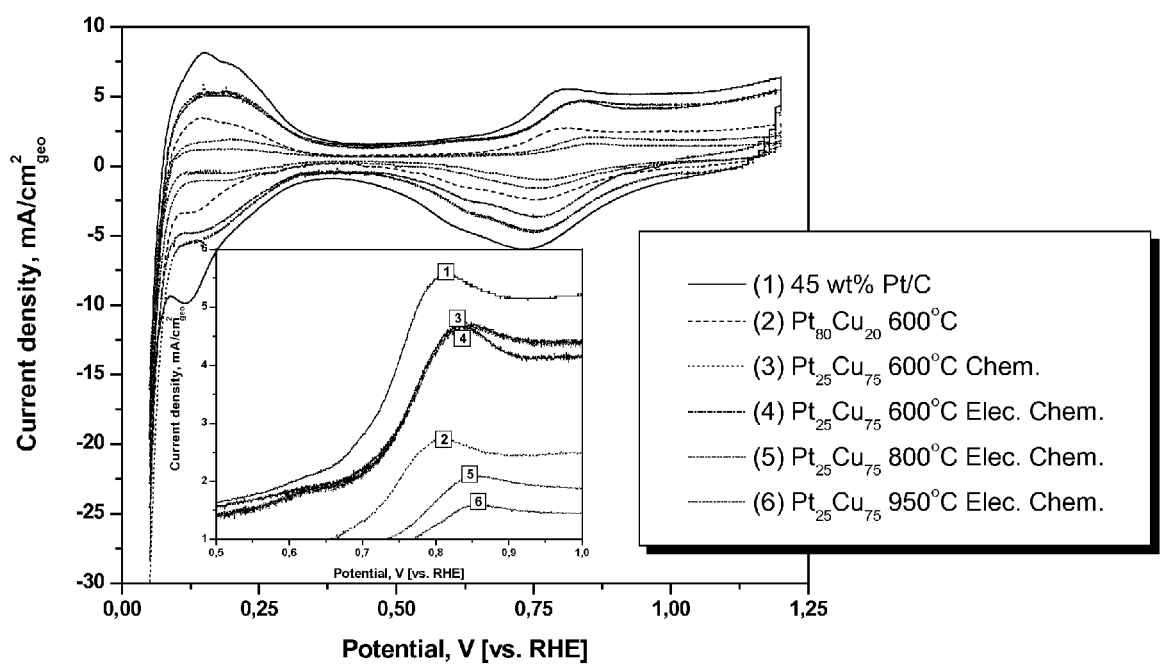
FIG. 6 illustrates a cyclic voltammogram of the chemically/electrochemically activated catalysts.

FIG. 6 shows the cyclic voltammetric profile of the standard Pt and de-alloyed Pt—Cu cathodes recorded at the end of the fuel cell MEA testing. The electrochemical surface-areas (ECSA) obtained by integrating the H ad/desorption peaks are summarized in Table 1. Due to its high geometric Pt mass loading, the standard Pt catalyst showed the largest surface area in absolute, while with increasing annealing temperature the ECSA dropped significantly due to particle growth. The effect of alloy composition on surface area is reflected by comparing the three Pt—Cu catalysts prepared at 600° C. Both the chemical and the electrochemically de-alloyed samples showed a slightly increase surface area compared to the $Pt_{80}Cu_{20}$ material at comparable Pt mass loadings possibly indicating the effect of some surface roughening in the Cu depleted catalysts.

The inset of FIG. 6 highlights the potential range where water activation leads to surface Pt—OH formation according to $Pt+H_2O \rightarrow Pt$—$OH+H^++e^-$. Anodic shift of the peak potentials for the de-alloyed catalysts compared to pure Pt or the $Pt_{80}Cu_{20}$ catalyst suggested a delayed formation of Pt—OH surface species during anodic sweeps. A shift of the Pt—OH onset potential was frequently observed before for Pt alloy electrocatalysts and was considered the cause for enhanced ORR activity or was perceived more of an effect of a reduced Pt—O chemisorption energy.

Origin of the Activity Enhancement and the Role of Surface Roughening

The ECSA values reported in Table 1 reflect that the origin of the significant ORR activity improvements is unlikely to be a surface-roughening based mechanism alone. Whereas de-alloying of bimetallic alloy interfaces has been reported to roughen the electrochemical interface and result in increased surface areas, the data in Table 1 shows that the ECSA values of the de-alloyed catalysts prepared at 800° C. and 950° C. are actually lower than that of the standard Pt catalyst. Even though the ECSA values of the materials prepared at 600° C. are slightly higher than that of the standard Pt value, they cannot account for the 3-4 fold activity increases, because activity is expected to scale linearly with ECSA. It should also be noted that the ECSA values of all the Pt—Cu alloy electrocatalysts in Table 2 were consistently lower than that of the 30 wt % carbon-supported Pt catalyst (82 $m^2/g$ Pt) which was used as starting material for the alloy synthesis. The electrochemical Pt surface area decreased during the synthesis and annealing process and even after de-alloying did not come back to the surface area values of the starting material.

With surface roughening ruled out as the primary origin for the activity enhancements, geometric, or surface structure, effects and/or electronic, or ligand, effects, become likely candidates to explain the modified surface catalytic activity. Both geometric and ligand effects may be caused by the surface atomic environment of distinct metal atoms which modify their electronic structure, and hence, their chemisorption and catalytic properties. Experimental results points to compressive surface lattice strain in de-alloyed Pt surface layers as the major cause for the unprecedented activity. Compressive lattice strain modifies the binding energies of the reaction intermediates (atomic oxygen, hydroxide, and superoxide species on surface of de-alloyed catalysts). This method is therefore able to introduce controlled amount of lattice strain in the surface of the de-alloying nanoparticle catalysts, and is therefore a much broader strategy to prepare high performance catalysts.

TABLE 2

| catalyst comp. atom % | anneal. temp., °C. | catalyst dealloying method | bulk comp. (ICP/EDX), atom % | near surface comp. (XPS), at % |
|---|---|---|---|---|
| $Pt_{80}Cu_{20}$ | 600 | | $Pt_{78}Cu_{22}{}^{c,e}$ | $Pt_{50}Cu_{50}{}^{e}$ |
| $Pt_{25}Cu_{75}$ | 600 | chemical$^a$ | $Pt_{60}Cu_{40}{}^{c,f}$ | $Pt_{28}Cu_{72};{}^{e}$ |
| | | | | $Pt_{81}Cu_{19};{}^{f}$ |
| | | | | $Pt_{90}Cu_{10}{}^{h}$ |
| $Pt_{25}Cu_{75}$ | 600 | electrochemical$^b$ | $Pt_{87}Cu_{13}{}^{c,g}$ | $Pt_{28}Cu_{72};{}^{e}$ |
| | | | | $Pt_{98}Cu_{2}{}^{g}$ |
| $Pt_{25}Cu_{75}$ | 800 | electrochemical$^b$ | $Pt_{82}Cu_{18}{}^{d,g}$ | $Pt_{92}Cu_{8}{}^{g}$ |
| $P_{25}Cu_{75}$ | 950 | electrochemical$^b$ | $Pt_{61}Cu_{39}{}^{d,g}$ | $Pt_{88}Cu_{12}{}^{g}$ |

$^a$Ex situ catalyst powder acid wash.
$^b$In situ MEA cathode layer voltammetry.
$^c$ICP analysis.
$^d$EDX analysis.
$^e$As prepared.
$^f$After chemical dealloying and before fuel cell testing.
$^g$After electrochemical dealloying and fuel cell testing.
$^h$After chemical dealloying and after fuel cell testing.

Relation Between Compositional Stability and the De-Alloying Method

Figure 7:
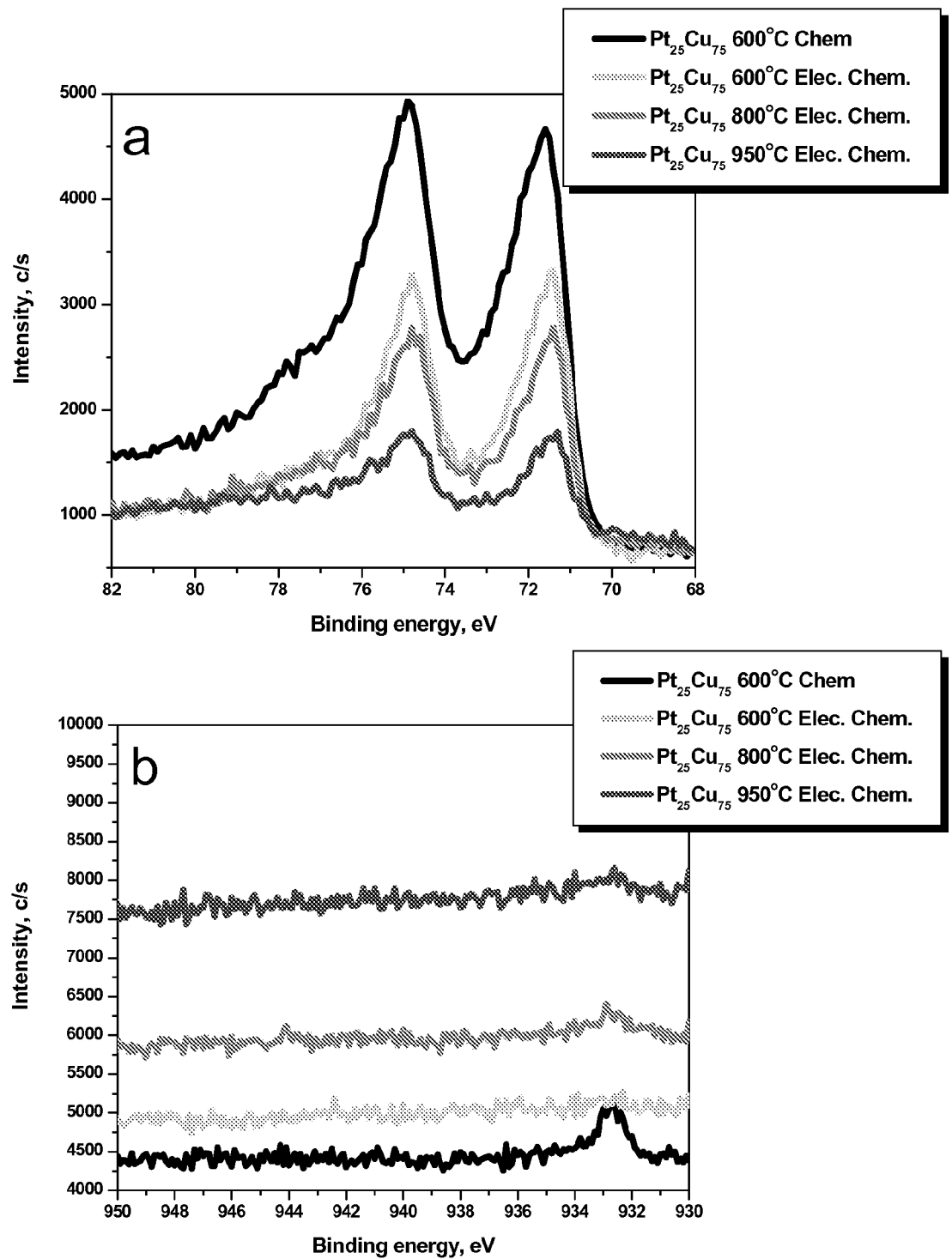
FIG. 7 illustrates X-ray photoelectron emission spectra of (a) Pt4f and (b) Cu2p core level regions of the four chemically and electrochemically dealloyed $Pt_{25}Cu_{75}$ precursors reported in Table 1.
Figure 8:
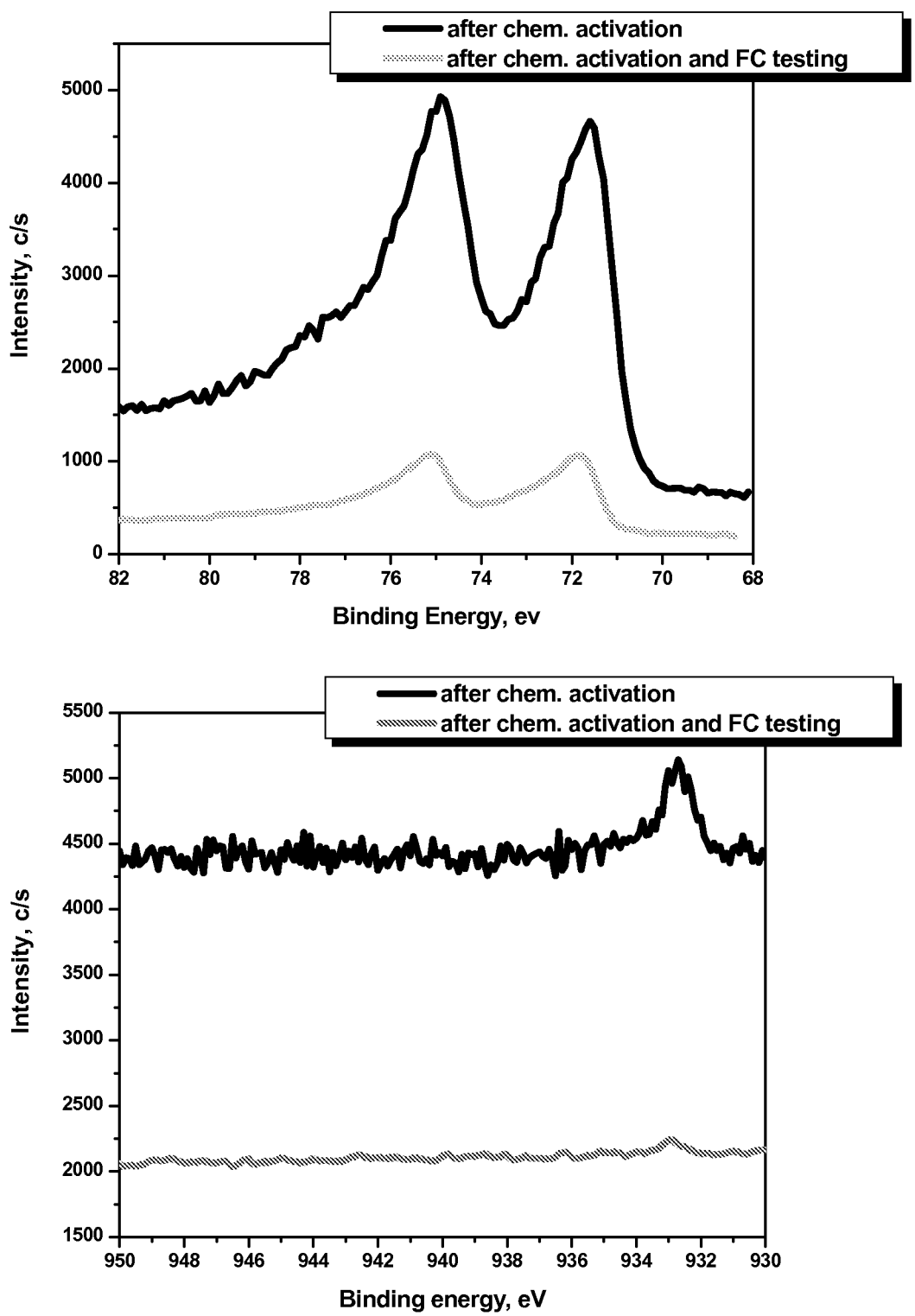
FIG. 8 illustrates X-ray photoelectron emission spectra of (a) Pt4f and (b) Cu2p core level region of the chemically leached Pt—Cu cathode catalyst powder before and after fuel cell testing.

To gain insight into the stability of the active phases of the de-alloyed Pt—Cu catalysts, their surface and bulk compositions were measured using ICP/EDX and XPS after synthesis, after de-alloying, and after MEA testing. The objective was a comparative evaluation of chemical versus the electrochemical de-alloying with respect to their effectiveness to yield stable and active catalyst phases. FIGS. 7 and 8 report the detailed XPS spectra of the de-alloyed catalysts from which the near surface composition of the alloy particles in Table 2 were estimated by probing depth to 5 atomic layers. Table 2 also reports the ICP/EDX bulk compositions.

Near Surface Compositions

FIGS. 7 (a) and (b) show the Pt4f and Cu2p3/2 spectra of the de-alloyed Pt—Cu bimetallic catalysts. Peak binding energies revealed the presence of mostly metallic Pt 71.3 eV, possibly contaminated with some PtO 74.6 eV and $PtO_2$ 74.9 eV species (not deconvoluted in FIG. 7). In contrast to the precursor materials, much reduced amounts of metallic Cu (932.8 eV49) were detected in the chemically de-alloyed samples, while only trace amounts of metallic Cu remained near the surface in case of the electrochemically de-alloyed catalysts (Table 2). No significant amounts of CuO species were observed in the de-alloyed catalyst, which indicates that only few, if any, Cu atoms are present in the first layer, as these atoms would very likely form Cu (hydr)oxide species upon contact with acidic liquid electrolytes. This is in agreement with the observed cyclic voltammetric profiles that indicated no detectable amount of residual Cu atoms in the surface. The XPS data give evidence that the near-surface region of the dealloyed Pt—Cu catalysts was severely enriched in Pt compared to the precursor materials.

Chemical and Electrochemical De-Alloying

The compositional data of the two de-alloyed $Pt_{25}Cu_{75}$ precursors, annealed at 600° C., (Table 2) suggests that electrochemical (cyclic voltammetric) de-alloying results in a more complete Cu dissolution than chemical acid leaching. The surface atomic composition of the chemically de-alloyed (acid washed) $Pt_{25}Cu_{75}$ precursor (600° C.) after de-alloying and before ORR testing was $Pt_{81}Cu_{19}$, and therefore was Cu richer compared to the $Pt_{93}Cu_7$ composition measured for an electrochemically de-alloyed (cyclic voltammetry) 600° C. $Pt_{25}Cu_{75}$ precursor before ORR testing. After catalytic testing, the chemically de-alloyed catalyst showed a surface composition of $Pt_{90}Cu_{10}$, while the corresponding electrochemically de-alloyed material resulted in a final near surface composition of $Pt_{98}Cu_2$ after measuring MEA polarization curves. FIG. 8 shows the corresponding detailed Photoemission spectra of the chemically de-alloyed $Pt_{25}Cu_{75}$ 600° C. material in the Pt4f and Cu2p regions. The photoemission peak at the Cu2p3/2 binding energy before recording the MEA polarization curves (FIG. 8b, top) is severely reduced compared to that after fuel cell testing (FIG. 8b, bottom). This is due to additional Cu leaching from the cathode layer during MEA operation. For both chemical and electrochemical de-alloying, additional Cu atoms seemed to dissolve during the MEA performance testing, although, the MEA was not exposed to potentials that are more positive during testing than those applied during de-alloying.

The surface compositional changes after MEA testing suggest that both chemical and electrochemical Cu de-alloying procedures did not result in a thermodynamically and therefore compositionally stable active catalyst phase. The de-alloying processes in both cases were likely limited by Cu atomic transport to the surface. Additional Cu leaching from the catalyst surface during MEA operation is likely to have a detrimental long-term effect on the ohmic resistance and, therefore, the performance of a MEA. Hence, to keep additional leaching to a minimum, the cyclic voltammetric de-alloying method appears as the preferable de-alloying method under the present conditions.

To rationalize the differences in the extent of de-alloying between acid wash and cyclic voltammetric treatment it is helpful to recall that chemical treatment of Pt—Cu alloys in air-saturated acids represents an electroless dissolution process at an open circuit (mixed) potential with the open circuit potential governed by all redox systems (metal and surface reactions) present. Chemical de-alloying of Pt—Cu alloys in air saturated acid occurs at a constant potential that ranges between that of the Cu standard potential (0.34 V/NHE) and the open circuit potential of a pure Pt cathode catalyst in a hydrogen/air fuel cell (typically around 0.95-1 V RHE). Since the potential is constant, passivation processes can build up protective surface layers which inhibit bulk de-alloying or slow down diffusion of Cu atoms to the surface. In contrast, the controlled cyclic voltammetric potential sweeps between 0.5 and 1.0 V/RHE (voltammetric de-alloying) entails repeated cycles of surface atomic oxidation/dissolution followed by Pt-oxide re-reduction. These processes are likely combined with a larger extent of potential-induced surface atomic rearrangements, which expose subsurface atomic layers and lead to a more complete Cu dissolution.

Bulk Compositions

A similar trend in the composition and degree of leaching between chemical and electrochemical de-alloying was obvious from the EDX bulk compositional analyses of the 600° C. precursor materials given in Table 2. A previous study reported that electrochemical de-alloying of a $Pt_{25}Cu_{75}$ precursor (annealed at 600° C.) resulted in a bulk composition of $Pt_{79}Cu_{21}$ before testing, and in $Pt_{87}Cu_{13}$ after MEA testing (Table 2). In contrast, chemical de-alloying resulted in a $Pt_{60}Cu_{40}$ composition before MEA testing.

Generally, it is unclear whether Cu surface de-alloying from Pt—Cu bimetallics can result in a Cu depleted alloy, which is thermodynamically stable under fuel cell operating conditions. The present findings do not preclude the existence of a thermodynamically stable Cu-depleted catalyst structure. Advanced density functional theory (DFT) calculations of metal dissolution processes may help predict a thermodynamically stable de-alloyed Pt—Cu particle structure. The addition of a third element in the precursor may also help stabilize the de-alloyed nanoparticle structure and composition. If a thermodynamically stable composition does not exist or is not attainable by dissolution processes, the de-alloying process continues to be controlled by Cu atom transport (most likely Cu bulk diffusion) and would eventually terminate in the complete removal of all Cu atoms from the nanoparticle precursors. In this case, the active catalyst phase would be transient in nature. However, from a practical fuel cell device point of view, a diffusion-controlled de-alloying process is acceptable, if the time scale of Cu dissolution reaches those of the device lifetime. In the case of a diffusion-controlled Cu dissolution process, the de-alloying protocol, which removes the most Cu from the surface at comparable performances, would be the preferred one.

Alloy Phase Structure Analysis

Figure 9:
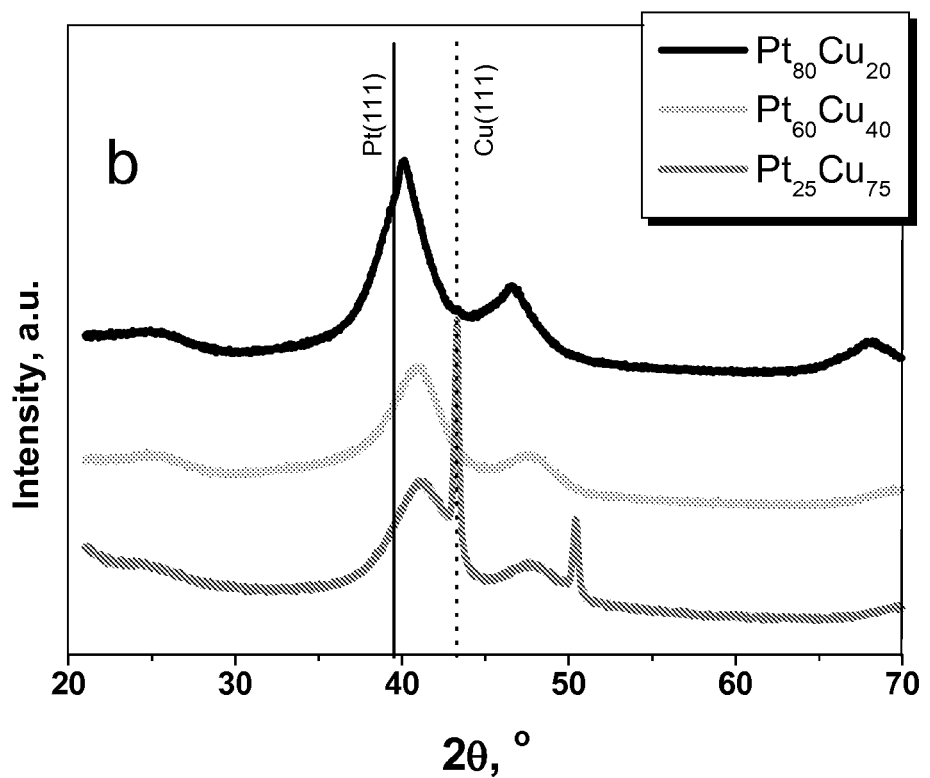
FIG. 9 (a) illustrates an X-ray diffraction profiles of carbon-supported $Pt_{25}Cu_{75}$ precursor catalysts annealed at 600° C., 800° C., and 950° C.
Figure 9:
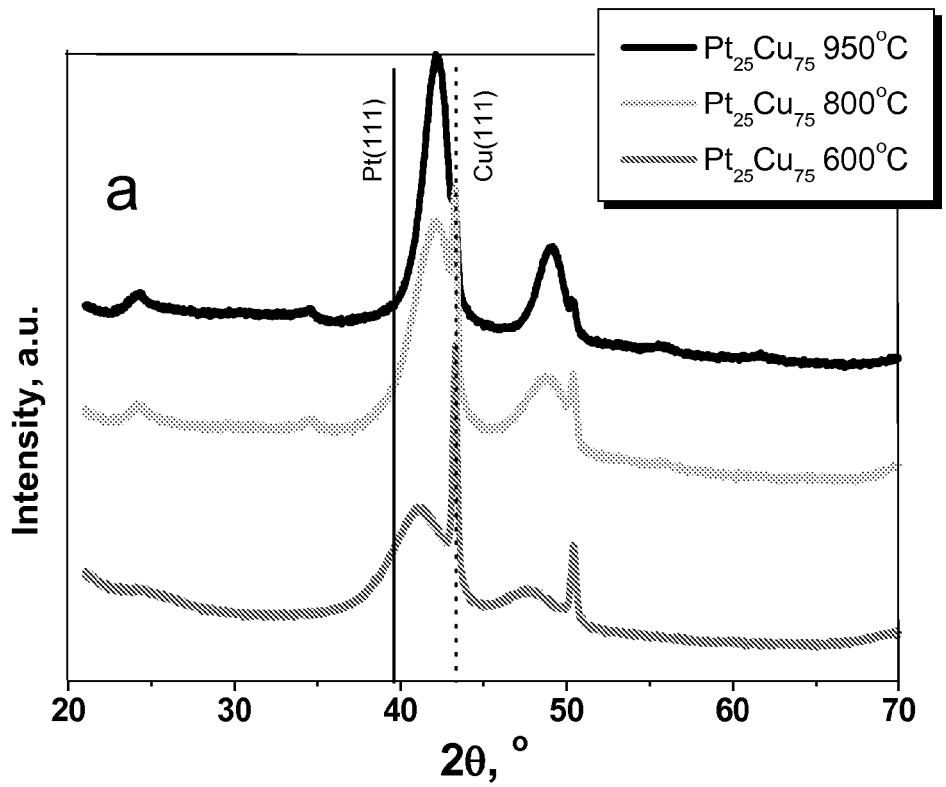

X-ray diffraction patterns of the $Pt_{25}Cu_{75}$ precursors materials prepared at the three annealing temperatures are compared in FIG. 9 (a). All materials crystallized in a similar disordered face-centered-cubic (fcc) structure, with depending to 43° the (111) fundamental reflection occurring in a 2θ range from 41.8° on the detailed alloy phase composition. For Pt—Cu bimetallics, Vegard's law provides an excellent mapping between phase composition and unit cell parameters. At 600° C., sharp Cu reflections indicate the presence of an unalloyed pure Cu phase. With increasing annealing temperatures, the alloy uniformity improved significantly. Reduced peak widths and an up shift of suggest temperature induced growth of alloyed the (111) reflection to 2θ=42° Pt—Cu crystallites. Even at 950° C., despite a generally uniform Pt—Cu alloy phase structure, peak shoulders indicate the presence of a bit of unalloyed Cu. FIG. 9 (b) demonstrates how chemical de-alloying affects the phase structure of a $Pt_{25}Cu_{75}$ 600° C. precursor catalyst. The bottom profile reports the annealed precursor patterns prior to de-alloying. The center profile shows the acid washed catalyst and evidence how the de-alloying procedure removes the unalloyed Cu phase. Furthermore, the Pt—Cu (111) reflection shifts from 41.8° to 41° suggesting a partial dissolution of Cu from the initial Pt—Cu alloy phase. Comparison to the pure Pt(111) peak position (39.7°) indicates that residual Cu (~40 atomic %, ICP) remained in the chemically de-alloyed material. The top profile in FIG. 7 (b) represents the structure of the as-prepared Pt80Cu20 catalyst. Absence of Cu peaks suggests uniform alloying. The alloy (111) reflection (40.5°) is consistent with its composition according to Vegard's law.

In a similar previous RDE study of voltammetrically de-alloyed $Pt_{25}Cu_{75}$ ORR catalysts, the catalyst annealed at 800° C. performed superior to that annealed at 950° C. in terms of Pt mass and specific activity after a similar de-alloying procedure. To explain the discrepancy to the present study, a comparison of the XRD profiles provided clues: In the previous study, the 800° C. annealed catalysts exhibited a XRD peak pattern and intensity ratio between Pt—Cu alloy phase and pure Cu phase similar to that of the present 950° C. sample. This observation raises the issue whether a rough evaluation of the ORR activity of de-alloyed $Pt_{25}Cu_{75}$ catalyst could be possible based on an XRD pattern alone.

Impact of Alloy Uniformity on Compositional Stability and Extent of De-Alloying

In this section, the impact of the annealing temperature of the $Pt_{25}Cu_{75}$ precursors on the extent of voltammetric de-alloying will be investigated using the compositional data in Table 2. The present data suggest that the amount of Cu removed from the precursor is strongly correlated with the annealing temperature. The higher the annealing temperature, the higher was the Cu bulk and surface concentration retained in the de-alloyed catalyst particles after MEA testing. For example, the 950° C. catalyst showed a Cu content of 39 and 12 at % in the bulk and in the surface after MEA testing, respectively (Table 2) which was significantly more Cu than in the 600° C. sample. Unless the de-alloyed 950° C. catalyst composition is thermodynamically stable, its relatively high residual Cu content makes detrimental Cu dissolution under continued MEA operation likely. In fact, this catalyst exhibited the least favorable polarization characteristics with increased ohmic and mass transport losses in FIG. 4. This is consistent with the notion that the 950° C. catalyst lost the least amount of Cu during the de-alloying protocol and continues to dissolve Cu ions into the membrane during MEA testing.

Interestingly, however, the 950° C. catalyst exhibited the highest kinetic Pt mass based and specific electrocatalytic activity which bears the question whether a somewhat Cu richer bulk (~40 atom %) and surface (~12 atom %) composition may be actually favorable for the surface catalysis. If so, the 800 and 600° C. catalyst may have passed through a similar active compositional state during the de-alloying protocol, yet since their Cu de-alloying rate was higher, the Cu composition at the time of MEA testing was already below the optimum. This discussion highlights the trade-offs between activity and stability of Pt alloy nanoparticles and demonstrates the difficulties one faces with a clear evaluation of relative alloy stability. Only long-term tests will ultimately be able to tell whether the compositional stability of a given ORR catalyst will be sufficient for practical durable cathodes.

Structural Model for De-Alloyed Pt—Cu Bimetallic Nanoparticles

A consistent structural and compositional model for the de-alloyed Pt—Cu nanoparticles emerges combining the XRD structural and compositional as well as the EDX and XPS compositional data. During the de-alloying process, Cu atoms rapidly dissolve from the surface of the Cu rich precursor particles. With increasing removal of Cu atoms from the top layer, Cu atoms start to move from the particle core toward the particle surface. Considering a slow Cu bulk movement compared to a fast surface Cu dissolution, the particle surface eventually depletes to relatively low concentrations of Cu after de-alloying. The catalyst particle cores still contain substantial amounts of Cu atoms (up to at least 13-40 at %) and a compositional gradient is established across the alloy particles.

Hence, the active de-alloyed Pt—Cu catalysts may be represented by a Pt enriched surface region (particle shell) surrounding an increasingly Cu-richer particle core: a de-alloyed Pt—Cu core-shell nanoparticle catalyst. Being Cu rich, the core of the de-alloyed particles exhibits a reduced lattice parameters compared to pure Pt (see FIG. 9). We hypothesize that the reduced lattice parameters in the core may affect the Pt inter-atomic distance of the Pt rich surface, giving rise to somewhat reduced Pt—Pt distances. This mechanism has been previously shown to result in modified surface catalytic activity.

CONCLUSION

We have presented a new class of highly efficient Pt—Cu alloy nanoparticle electrocatalysts for the electroreduction of oxygen at PEMFC cathodes. The active phase of the Pt—Cu alloy nanoparticle electrocatalysts were prepared by Cu de-alloying, that is selective dissolution of Cu atoms from the nanoparticle surface, of a $Pt_{25}Cu_{75}$ alloy precursor compound. The de-alloyed Pt—Cu catalysts showed a surface catalytic improvement of a factor of up to 4 in terms of Pt mass activity and of more than 10 times in terms of specific activity compared to a state-of-art Pt cathode catalyst. We have demonstrated the viability of an in-situ voltammetric de-alloying procedure inside the cathode layer followed by an ion exchange step of excess Cu ions in order to prepare the active catalyst phase inside the MEA. This catalyst activation procedure by de-alloying was shown to lend itself well to the conventional MEA structure of PEMFCs and therefore does not require any significant modification of the state-of-the-art technology.

Chemical de-alloying procedures (acid washes) were compared against voltammetric de-alloying procedures. At given synthesis conditions, electrochemical de-alloying methods were more effective in the removal of Cu from the precursor compounds compared to voltammetric de-alloying procedures minimizing Cu ion contaminations after ion exchange. The extent of Cu removal by voltammetric methods depended significantly on the annealing temperature of the precursor alloy. Uniformly alloyed Pt—Cu nanoparticles prepared at 950° C. lost less Cu at a given de-alloying protocol and exhibited the most favorable ORR Pt mass and specific activities despite their low surface areas. This underlined the fine balance between alloy catalyst stability and ORR activity.

Surface area measurements after de-alloying have ruled out a surface roughening mechanism as the origin for the observed ORR activity enhancements in favor of electronic and/or geometric surface effects. Compositional analysis points to a Cu-rich core—Pt-enriched shell structure as a model for the de-alloyed particles. The sharply lattice-contracted core region may result in a reduced Pt—Pt interatomic distance in the Pt rich surface region in line with early theoretical predictions on the effect of geometric atomic arrangements on catalytic surface rates.

Further examples may be found for instance in the following references:

Mani, P.; Srivastava, R.; Strasser, P. Dealloyed Pt—Cu Core-Shell Nanoparticle Electrocatalysts for use in PEM Fuel Cell Cathodes. *J. Phys. Chem.* C, 112, 2770-2778 (2008)→ most of it is included already Srivastava, R.; Mani, P., and Strasser, P. Efficient Oxygen Reduction Fuel Cell Electrocatalysis on Voltammetrically De-alloyed Pt—Cu—Co Nanoparticles. *Angew. Chem. Int. Ed.*, 46, 8988-8991 (2007)

Mani, P.; Srivastava, R.; Yu, C., and Strasser, P. In-situ, in-layer de-alloying of Pt-M intermetallics for high performance PEMFC electrode layers: MEA activity and durability studies. *ECS Transactions*, 11, 933-940 (2007)

We claim:

1. A method for fabricating a de-alloyed fuel cell assembly, comprising:
    preparing a catalyst suspension, comprising cobalt and $Cu(NO_3)_2.5H_2O$;
    coating a medium with the catalyst suspension, to form a catalyst coated medium;
    de-alloying the catalyst coated medium to form an electrode assembly; and
    fabricating a fuel cell using the electrode assembly.

2. The method of claim 1, wherein preparing the catalyst suspension further comprises
    creating at least one precursor suspension, comprising a cobalt base metal salt and the $Cu(NO_3)_2.5H_2O$;
    admixing a metal with the at least one precursor suspension to form a mixture;
    drying the mixture to form a powder;
    annealing the powder to form a catalyst precursor; and
    suspending the catalyst precursor in a solvent to form the catalyst suspension.

3. The method of claim 2, wherein the catalyst suspension comprises at least one metal chosen from the group consisting of gold, silver, nickel, palladium, chromium, molybdenum, manganese, titanium, scandium, tungsten, vanadium, and alloys thereof.

4. The method of claim 3, wherein the catalyst suspension comprises platinum.

5. The method of claim 2, wherein admixing the metal with the precursor suspension comprises admixing platinum.

6. The method of claim 2, wherein the step of drying the mixture comprises freeze-drying under vacuum.

7. The method of claim 6, wherein freeze-drying comprises freeze-drying in liquid nitrogen.

8. The method of claim 2, wherein annealing comprises heating the powder to a temperature between about 400° C. and about 1200° C.

9. The method of claim 2, wherein suspending the catalyst precursor comprises forming a dispersion.

10. The method of claim 2, wherein suspending the catalyst precursor further comprises admixing a copolymer.

11. The method of claim 10, wherein admixing a copolymer comprises dispersing the copolymer to form the catalyst suspension.

12. The method of claim 1, wherein coating the medium comprises coating a membrane, wherein the membrane comprises a first side and a second side opposite the first side.

13. The method of claim 12, wherein coating the membrane comprises spraying the catalyst suspension onto the membrane.

14. The method of claim 12, wherein coating the membrane comprises:
    forming a catalyst paste from the catalyst suspension; and
    applying the catalyst paste to the membrane.

15. The method of claim 12, wherein fabricating a fuel cell further comprises
    positioning the electrode assembly adjacent to a gas media wherein the gas media is maintained at 101.3 kPa on the first side and the second side of the membrane; and
    activating the electrode assembly.

16. The method of claim 15, wherein the gas media comprises a gas selected from the group consisting of hydrogen, oxygen, nitrogen, and combinations thereof.

17. The method of claim 15, wherein the gas media comprises a temperature between about 40° C. and about 120° C.

18. The method of claim 15, wherein the gas media comprises a relative humidity of at least 70%.

19. The method of claim 15, wherein activating the electrode assembly comprises maintaining a potential between about 0.2V and about 2V.

20. The method of claim 19, wherein the potential is maintained for between about 1 hour and about 10 hours.

21. The method of claim 1, wherein de-alloying the catalyst coated medium comprises
    treating the catalyst coated medium with an acid;
    washing the catalyst-coated medium with a solvent; and
    drying the catalyst-coated medium to form an activated membrane.

22. The method of claim 21, wherein the acid comprises a strong hydrogen donating acid, selected from the group consisting of sulfuric acid, acetic acid, hydrochloric acid, nitric acid, perchloric acid, hydrobromic acid, hydroiodic acid and combinations thereof.

23. The method of claim 21, wherein drying the catalyst-coated medium comprises heating the catalyst coated medium to form an activated membrane.

* * * * *